US006476733B1

(12) United States Patent
Amiri

(10) Patent No.: US 6,476,733 B1
(45) Date of Patent: Nov. 5, 2002

(54) THIN ELECTRONIC DATA INPUT DEVICE

(76) Inventor: Ahmad Amiri, 20 Bridewell Cr., Richmond Hill - Ontario (CA), L4C 9C4

( * ) Notice: Subject to any disclaimer, the term of this patent is extended or adjusted under 35 U.S.C. 154(b) by 0 days.

(21) Appl. No.: 09/179,550

(22) Filed: Oct. 28, 1998

Related U.S. Application Data

(63) Continuation-in-part of application No. 08/894,675, filed as application No. PCT/CA96/00111 on Feb. 26, 1996, now abandoned.

(51) Int. Cl.$^7$ .............................................. H03K 17/94
(52) U.S. Cl. ......................... 341/20; 341/34; 200/5 R; 361/681
(58) Field of Search .............................. 341/20, 22, 34; 200/5 R, 5 B, 5 A; 345/168, 173; 361/679, 680, 681, 749, 759

(56) References Cited

U.S. PATENT DOCUMENTS

| | | | |
|---|---|---|---|
| 4,218,603 A | 8/1980 | Satoh | 200/312 |
| 4,221,975 A * | 9/1980 | Ledniczki et al. | 341/20 |
| 4,640,994 A | 2/1987 | Komaki | 200/5 A |
| 4,725,817 A * | 2/1988 | Wihlborg | 341/34 |
| 4,755,634 A * | 7/1988 | Pepper, Jr. | 341/20 |
| 5,220,521 A | 6/1993 | Kikinis | 364/709.08 |
| 5,595,449 A * | 1/1997 | Vitkin | 341/22 |
| 5,616,897 A | 4/1997 | Weber et al. | 200/5 A |
| 5,648,771 A | 7/1997 | Halgren et al. | 341/22 |
| 5,666,112 A | 9/1997 | Crowley et al. | 341/22 |
| 5,790,371 A * | 8/1998 | Latocha et al. | 361/681 |

FOREIGN PATENT DOCUMENTS

| | | |
|---|---|---|
| DE | 29 32 540 | 2/1981 |
| GB | 2 279 617 A | 11/1995 |
| WO | WO92/15083 | 9/1992 |
| WO | WO93/15518 | 8/1993 |

* cited by examiner

Primary Examiner—Timothy Edwards, Jr.

(57) ABSTRACT

This invention relates to a thin electronic data input device. Some versions of the input device may be foldable, and some versions are capable of being rolled up. Still other versions are capable of being disintegrated into smaller sub-parts. Other versions have one or more of these properties. In the preferred embodiment of the invention, a thin electronic data input device for generating electrical signals for transmission to an electronic device, such as a computer, in response to an operator's finger strokes is provided. The data input device comprises a thin circuit board made of a material on which thin electronic circuitry can be affixed. The electronic circuitry includes at least one node, electrically coupled to the circuit board, so that when touched by a finger, a unique signal associated with that node is transmitted to the electronic device. The data input device can be in one piece or comprised of two or more sub-parts connected together by hinges or flexible joints along a common side or edge between adjacent sub-parts. The data input device can comprise more than two sub-parts that may fold on each other longitudinally and latitudinally.

22 Claims, 2 Drawing Sheets

THIN ELECTRONIC DATA INPUT DEVICE

RELATED APPLICATIONS

Figure 1:
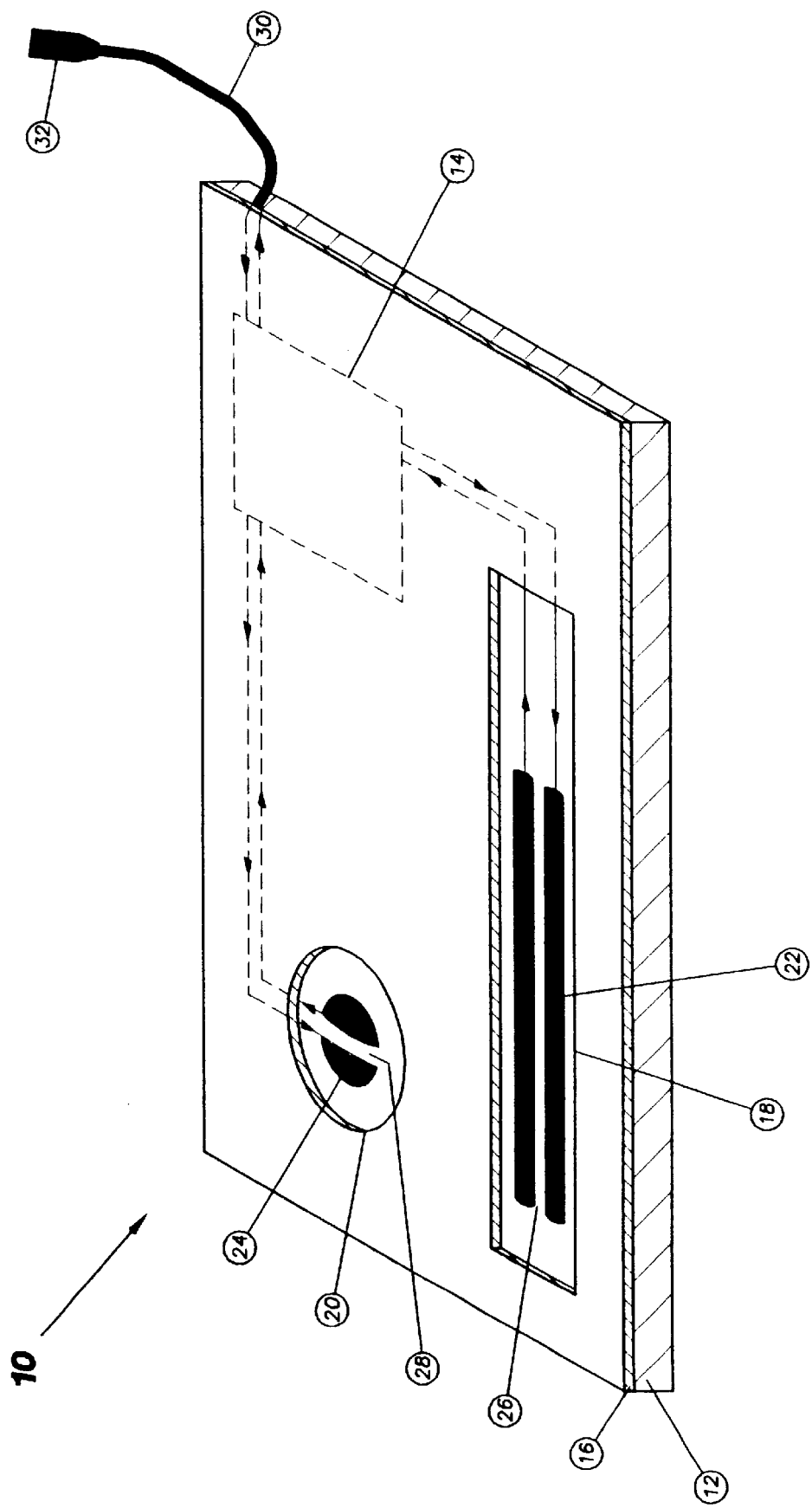

The following is a continuation-in-part application to U.S. patent application, Ser. No. 08/894,675, that was filed on Aug. 27, 1997, entitled THIN ELECTRONIC DATA INPUT DEVICE, abandoned, which application was a National Phase entry of PCT international application, No. PCT/CA96/00111, that was filed Feb. 26, 1996, entitled THIN ELECTRONIC DATA INPUT DEVICE.

FIELD OF THE INVENTION

The present invention relates to a device for data entry into data processing machines, in particular computers. Currently, conventional keyboards perform this task.

BACKGROUND OF THE INVENTION

Prior art (existing keyboards or their conventional variations) comprise an electronic circuit board, underneath a set of alphanumeric keys kept apart from the circuit board by a spring or similar device. Pressing a key down causes the electronic contact that will eventually translate into input data.

International publication, No. WO93/15538, discloses a touch sensitive panel having a front face with all the circuit elements on the rear face of the panel. This panel is typically used with industrial machinery.

U. K. patent application, No. GB 2279617 discloses a palmtop computer with an attached flexible film keyboard that can be folded behind the computer when not in use. Flexible film keyboards are not suited to being folded, however, as the flexible keys become stressed when folded, leading to less flexibility over time.

Moreover, flexible film or membrane keyboards require a gap between the membrane and the base of the keyboard, and therefore are not as thin as desirable for multiple foldability.

German patent, No. DE-A-2932540 consists of a liquid crystal display with a conductive plate cut out in certain sensor gratings. The patent focuses on creating a unique display on the LCD for each different sensor grating. This requires extra layers, for the LCD and other components that increase thickness.

One disadvantage of prior art keyboards is that the keyboards have to accommodate the circuit board plus the separating device (e.g., a spring) plus the keys, and therefore are relatively thick. It is not easy to substantially reduce thickness.

Another disadvantage of prior art keyboards is that to reduce the width and length, the keys must become smaller and the distances between the keys and the underlying circuit board reduced. Shrinking a keyboard to small or pocket size dimensions sacrifices convenience and speed of operation—especially for operators with large fingers and hands. In fact, beyond some point, a shrunken keyboard becomes impossible to operate.

Another disadvantage of prior art keyboards is that the circuit board, the keys, and the separating devices are housed in a box and preferably have a lid protecting the keys, resulting in heavier weight.

Another disadvantage of prior art keyboards is that keys can be stuck to adjacent keys and either have restricted movement or that pressing a key can cause adjacent keys to be pressed too.

Another disadvantage of prior art keyboards is that spilled drinks or solid particles can penetrate the gap formed between adjacent keys to the circuit board and disrupt the circuitry and/or glue that holds the keys together or to the circuit board.

Another disadvantage of prior art keyboards is that the spring mechanisms underneath the keys can become less responsive over time and lose their rebounding property.

Another disadvantage of prior art keyboards is the noise of operation. For example, using conventional keyboards in a quiet library or in a shared bedroom is not desirable.

Another disadvantage of prior art keyboards is that it is not easy to clean the keys, especially visible faces on and between keys, which do get dirty, especially in a dirty environment.

Another disadvantage of prior art keyboards is that since the keys have to be light and easy to press, they are generally not firm and bulky, and therefore are vulnerable to breakage. In other words, for transportation and use, keyboards should be treated as "fragile", which is not very convenient considering their extensive daily use.

Another disadvantage of prior art keyboards is that the time required for data entry is not just the time required for an operator's finger to touch a key. The time for each key to travel the distance to the underlying circuit board, plus often the time for the operator to feel the key's rebound before next key is pressed, reducing speed, must also be considered.

Some of the above disadvantages do not apply to a type of keyboard currently used in, for example, fast food restaurant order entry and on some hand held calculators. In these keyboards the circuit board is separated from the keys by a bubble gap that is closed by pressing the keys surface. This surface is generally constructed of a material with spring-like properties that keep the key surface and circuit board separate (until pressure is applied to the key surface). The problem with this kind of keyboard is that the pressure needed to cause contact between the keys and the circuit board is relatively "high" making data entry slow and laborious.

There are other methods of data entry that when advanced and perfected in the future may reduce the need for keyboards, such as "voice recognition" and "handwriting recognition". Currently, however, these methods are slower than finger operated data entry.

It is desirable to have a finger operated data entry device that has the following properties:

- It can be operated by touch, usually by an operator's finger, so that higher speeds can be attained for data input;
- All the symbols for recognition of a given entry are laid-out on a surface large enough for easy identification and operation;
- The device can be small, light, sturdy, and portable; and
- It does not have any or many of the disadvantages of the prior art keyboards listed above.

SUMMARY OF THE PRESENT INVENTION

The present invention relates to a thin electronic data input device. Some versions of the input device may be foldable, and some versions are capable of being rolled up. Still other versions are capable of being disintegrated into smaller sub-parts. Other versions have one or more of these properties.

In one version of the invention, a thin electronic data input device for generating electrical signals for transmission to an electronic device, such as a computer, in response to an operator's finger strokes is provided. The data input device comprises a thin circuit board made of a material on which thin electronic circuitry can be affixed, such as a printed circuit, as is well known to those skilled in the art. The electronic circuitry includes at least one node, electrically coupled to the circuit board, so that when touched by a finger, a unique signal associated with that node is transmitted to the electronic device or receiving processor or computer.

One standard way of achieving this is for the node to have a first portion and a second portion that are spaced apart and electrically isolated from each other by a narrow gap. If the gap is closed at that node, it will signal entry of particular symbol (letter, figure, etc.) to the receiver of data (usually, but not necessarily, a computer). The gap is usually bridged by the operator's finger touching the gap and completing the circuit. As the human body conducts some electricity, bridging the gap by finger will cause some electronic flow that signals the particular node whose gap has been touched. In essence, the operator's finger does what the pressed key in a conventional keyboard does.

In circumstances, where a human finger does not provide sufficient conductivity to connect the node gap, the operator can wear special conductive finger cups.

In another version of the invention, the data input device can be comprised of two or more sub-parts connected together by a hinge, or flexible joint along a common side or edge between adjacent sub-parts. Similarly the data input device can comprise more than two sub-parts that may fold on each other longitudinally and latitudinally, i.e., along one edge of a given sub-part, and along a subsequent edge—usually at 90° to the first edge. A typical data input device may comprise multiple sub-parts folding longitudinally within each row and latitudinally along the edge of an extreme sub-part in each row.

The electronic circuitry will be coupled between sub-parts via flexible cables. These cables are preferably affixed on the same sides of the sub-part as the flexible joints. All this allows the data input device to fold to a smaller width and length and fit into a pocket of an operator.

One typical application is a keyboard version with a full size symbol set comprised of equal sub-parts in 3 rows of 4 sub-parts in each row. All the rows fold 4 times longitudinally, while the extreme sub-part along the respective edges of each row fold latitudinally. This provides for 12 folds that allow the data input device to easily fit into the pocket of an operator.

A thin layer of protective film, leaving only the nodes exposed for touch by an operator's finger may cover the electronic circuitry.

BRIEF DESCRIPTION OF THE DRAWING FIGURES

Figure 2:
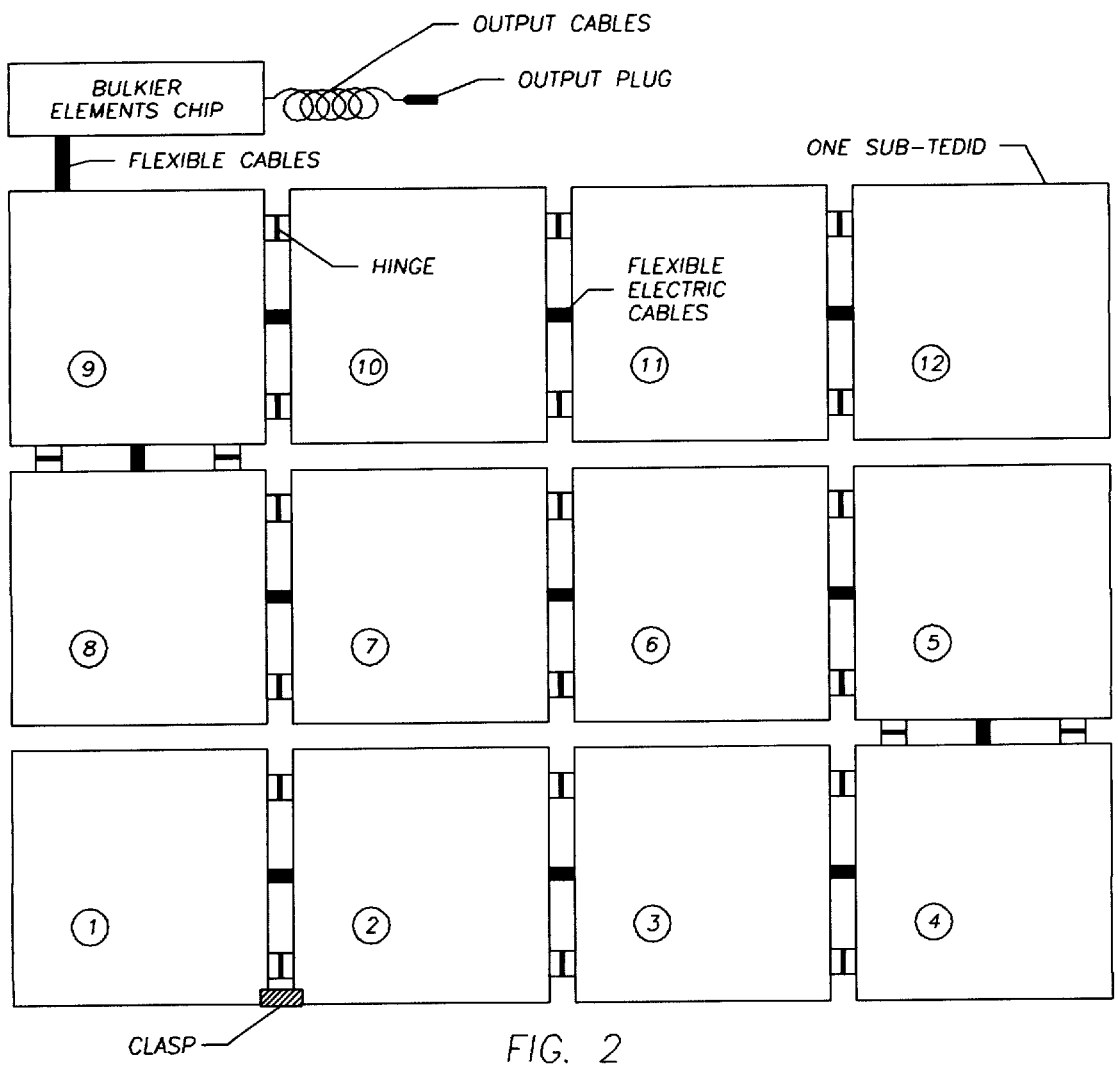

The invention is better illustrated with reference to drawings in which:

FIG. 1 is a perspective view of an embodiment of a simple one-piece data input device; and FIG. 2 is a foldable data input device as an assembly of 12 sub-parts.

DESCRIPTION OF THE PREFERRED EMBODIMENT

Referring to the drawings, a simple data input device 10 comprises a thin circuit board 12 on which thin electronic circuitry 14 is affixed using, for example, printed circuit technology, as is well known to those skilled in the art, and covered by a thin non-conducting protective layer 16. The application of a thin non-conductive protective layer to a circuit board is well known to those skilled in the art. Layer 16 can have openings 18, 20 exposing nodes 22, 24 and their associated gaps 26, 28. When a finger is placed over both portions—which in the preferred embodiment comprise an anode and cathode—of a node, the gap is bridged, and electronic current flows through the circuitry generating a signal associated with the symbol touched. The signal is eventually transmitted to a computer or other receiving device (not illustrated) via connection cord 30 and plug 32.

FIG. 2 illustrates a typical assembly 34 of twelve sub-parts; each comprising a typical data input device of this invention. The assembly 34 comprises sub-parts 36, 38, 40, 42, 44, 46, 48, 50, 52, 54, 56, and 58, all connected to adjacent sub-parts along common edges by hinges or flexible joints 60, 62, 64, 66, 68, 70, 72, 74, 76, 78, 80, 82, 84, 86, 88, 90, 92, 94, 126, 128, and 130, 132, respectively. The electronic circuitry of each sub-part is coupled to the adjacent circuitry of a respective adjacent sub-part via flexible cables 96, 98, 100, 102, 104, 106, 108, 110, 112, 122, and 124.

Thicker elements of the electronic circuitry are housed in an external detachable chip 114 that is connected to the rest of the assembly via a flexible cable 116. The electronic circuitry of the data input device is connectable to the computer or other receiving device via cable set 118 and plug 120. In a typical data input device of this invention, the preferred folding sequence first comprises folding sub-part 58 into overlying relation with sub-part 56—face to face, or top to top. While maintaining sub-part 58 and sub-part 56 in this overlying relationship, the back face or bottom of sub-part 56 folds into overlying relation with the back face or bottom of sub-part 54. Then while sub-parts 58, 56, and 54 are kept in their folded relationship, the top of sub-part 54 is folded into overlying relation with the top of sub-part 52. This pattern is repeated with sub-part 52 and sub-part 44 folded bottom to bottom; sub-part 44 and sub-part 46 folded top to top; sub-part 46 and sub-part 48 folded bottom to bottom; sub-part 48 and sub-part 50 folded top to top; sub-part 50 and sub-part 42 folded bottom to bottom; sub-part 42 and sub-part 40 folded top to top; sub-part 40 and sub-part 38 folded bottom to bottom; and sub-part 38 and sub-part 36 folded top to top.

Some of the flexible joints may be detachable, and some of the corresponding flexible cables depluggable. This allows some of the sub-parts of the data input device to be detached from the main assembly. On certain occasions, only the most essential sub-parts of the data input device need be carried, or carried stacked on one another for further versatility.

Sub-parts of the data input device may be of different sizes, but should be such to enable folding if so desired. The size and shape of each sub-part and their number is a matter of design and application, as will be understood to those skilled in the art.

In another version of the invention the sub-parts of the data input device may be made of thin pressure sensitive electronic screen—also known as touchscreens—and currently in use for a variety of applications, as is well known to those skilled in the art. Such flat screens convert pressure (usually from a finger) into variation in electric current or voltage that signals a symbol as represented on the keyboard. Such screens can also be programmed to register desired pressure so that even a light touch can be registered or a touch less than some pre-selected pressure level is ignored. These screens can be programmed to signal different symbols when a different part of the screen is touched. A map of which location to touch for each symbol can be electronically imposed on the screen. Such electronic maps are re-programmable for various sets of symbols. For example it can be programmed to map the English alphabet on the screen for one application, and then reprogrammed to map the Greek alphabet on the screen for another application. In short, conversion of a touch screen data input device from one set of symbols to another set of symbols could be achieved by internal programming. In another version of the invention, the thin circuit board of the data input device might be made of a thin flexible material, such as rubber, on which the electronic circuitry is affixed. Again, a thin layer of flexible non-conducting material may cover the electronic circuitry, leaving only the nodes exposed, where desirable. This kind of data input device could be folded or rolled, for transport and storage, and shaped for further versatility. Also, this flexibility can be in more than one sub-part of the data input device and can be attached or detached from the assembly, as explained for the rigid version.

It is possible to have a data input device with many types of symbols that can be added on by adding extra sub-parts. These sub-parts can be folded or rolled or detached for transport, as the case may be.

The rigid version of the data input device may be flat, concave, convex, or have any other shape that may suit some ergonomic or other purpose, though some shapes and designs may reduce folding freedom, as will be understood by those skilled in the art.

The flexible joints can be provided with a lock (not illustrated) to hold an angle of one sub-part with respect to an adjacent sub-part when partially open. This allows the data input device to rest at an angle to an underlying surface or desk for ease of operation.

The data input device can also be provided with folding or detachable supporting means, such as legs, to hold it at an angle to an underlying surface or desk for easier operation.

Rods (not illustrated) can optionally be provided to pass through grooves or loops (not illustrated) on the sides or on the bottom of a sub-part to keep the data input device assembly in the desired shape or angle.

The lock, for example, can be a removable or fixed clasp 150 holding two adjacent sub-parts at a desired angle to one another—even if an underlying surface or desk does not support the assembly of sub-parts.

To further reduce the overall thickness of a data input device, any thicker electronic circuitry can be located on one or more sides of the device. At such a location the thicker components could be used for some secondary function, for example, to keep the data input device at an angle to the desk for easier operation. For multi-piece data input devices, such thicker elements of the circuit may be placed on one or more of the sub-parts leaving as many sub-parts as thin as possible.

An alternative way to reduce thickness of the data input device is to design the electronic circuitry so that most or all of any bulkier elements are grouped together in one or more chips. These thicker chips are electronically connected to the rest of the data input device via flexible cables, preferably by one or more detachable plugs, all as is well known to those skilled in the art.

To reduce weight and costs and complexity, the flexible electronic cable coupling electronic circuitry between sub-parts of the data input device can be incorporated with the flexible joints, as would be known to those skilled in the art.

The bottom or top surface of the sub-parts of the data input device might be adhered or stuck on a sheet made of flexible material, such as rubber. This will allow for greater strength in the flexible connection between sub-parts. To allow for folding adjacent sub-parts are spaced from one another. Further, if necessary, such sheet is open over the nodes to expose the electronic circuitry as described above.

In versions of the date input device using pressure sensitive screens, any overlying sheet need not have openings at the nodes but should allow pressure to be transmitted to the nodes. Any visual symbol associated with that node should also be visible to an operator.

Some uses of the data input device of this invention include thinner and lighter keyboards for portable computers. Further, foldable versions of the data input device of this invention will allow for portable computers with keyboards that can be folded to fit within an operator's pocket.

It will be appreciated that numerous modifications and variations of the illustrated embodiments and versions may be employed without departing from the inventive concept herein.

I claim:

1. A thin foldable data input device for generating electrical signals for transmission to an electronic device in response to an operators finger strokes, the data input device comprising at least two subparts with each subpart having a top face and a bottom face and foldable along neighboring sides, and transmission means connected to at least one sub-part to transmit the electrical signals generated from the electronic circuitry to the electronic device, each subpart comprising;

a thin circuit board having a top surface;

thin electronic circuitry affixed to the circuit board to generate electrical signals for transmission to an electronic device in response to an operators finger strokes, said electronic circuitry including:

at least one node positioned on the top surface of the circuit board and electrically coupled to the circuit board for generating an electrical signal associated with that node for transmission to the electronic device, each node having;

a first portion and a second portion that are exposed and touchable by an operators finger and are spaced apart and electrically isolated from each other by a gap, so that when an operator's finger touches the exposed first portion and second portion of the node the first portion is electrically connected to the second portion through the operator's finger to generate the electrical signal associated with that node for transmission to the electronic device, the electrical signal signaling that the gap has been closed for that node;

at least one electrical coupling to electrically connect the electronic circuitry of the sub-part to electronic circuitry of at least one other adjacent sub-part; and at least one hinge adapted to attach the sub-part to at least one other adjacent sub-part so that adjacent sub-parts can fold with respect to one another face to face, wherein all the sub-parts connect to form the data input device.

2. A thin foldable data input device according to claim 1 wherein the thin circuit board of at least one sub-part is rigid.

3. A thin foldable data input device according to claim 1 wherein the thin circuit board, the thin electronic circuitry, and the non-conductive layer of at least one sub-part are flexible.

4. A thin foldable data input device according to claim 1 wherein each sub-part is a thin pressure sensitive electronic touch screen.

5. A thin foldable data input device according to claim 1 wherein said hinge includes a lock so that the adjacent sub-parts can be positioned at a desired angle with respect to one another.

6. A thin foldable data input device according to claim 1 further comprising clasps adapted to secure adjacent sub-parts at a desired angle with respect to one another.

7. A thin foldable data input device according to claim 1 wherein some or all of sub-parts can be disconnected from one another for transport.

8. A thin foldable data input device according to claims 1, 2 or 3, wherein the transmission means is detachable from the electronic device.

9. A thin foldable data input device according to claim 8 further comprising a separate thin chip electronically connected to the data input device and wherein at least some thicker elements of the electronic circuitry are located on the separate thin chip.

10. A thin foldable data input device according to claim 1 wherein the top surface of some or all of the sub-parts is provided with a thin non-conductive layer positioned over the electronic circuitry and open over every node a sufficient extent to expose the first portion and second portion of the nodes.

11. A thin foldable data input device according to claim 10 wherein the electrical coupling comprises at least one flexible cable.

12. A thin foldable data input device according to claim 10 wherein the hinge and the electrical coupling are of integral construction.

13. A thin foldable data input device according to claim 10 wherein the thin non-conductive flexible layer is continuous over at least two adjacent sub-parts and acts as the hinge allowing adjacent sub-parts to fold with respect to one another.

14. A thin foldable data input device according to claim 10 wherein the bottom surface of some or all of the sub-parts is provided with a thin nonconductive layer and the thin non-conductive flexible layer is continuous over at least two adjacent sub-parts and acts as the hinge allowing adjacent sub-parts to fold with respect to one another.

15. A thin foldable data input device according to claim 1 wherein the sub-parts are arranged in one or more rows such that the adjacent sides of adjacent sub-parts are of substantially equal size and parallel to each other.

16. A thin foldable data input device according to claim 15 wherein the adjacent sides of adjacent sub-parts are substantially aligned end-to-end.

17. A thin foldable data input device according to claim 16 wherein each sub-part on each row is connected electronically and physically to only one or two adjacent sub-parts on the same row, but not to any subpart on any other row, wherein only one of the end sub-parts on each row is connected to an adjacent sub-part of only one adjacent row.

18. A thin foldable data input device according to claim 17 wherein the transmission means exits from a side of one of the sub-parts that is not adjacent to any other sub-part when all the sub-parts are unfolded.

19. A thin foldable data input device of claim 18 wherein the lengths of all the sub-parts are substantially equal and the widths of all the sub-parts are substantially equal.

20. A thin foldable data input device according to claim 19 wherein all the sub-parts are thin flat rectangles.

21. A thin foldable data input device according to claim 20 wherein at least some thicker elements of the electronic circuitry are located on a sub-part that is connected to only one other sub-part.

22. A thin foldable data input device according to claim 21 wherein the transmission means connects to the sub-part that is connected to only one other sub-part.

* * * * *